United States Patent
Beaman et al.

(10) Patent No.: US 8,397,051 B2
(45) Date of Patent: Mar. 12, 2013

(54) HYBRID HASH TABLES

(75) Inventors: Peter D. Beaman, Newton, MA (US); Robert S. Newson, Windsor (GB); Tuyen M. Tran, Westwood, MA (US)

(73) Assignee: Autonomy, Inc., San Francisco, CA (US)

( * ) Notice: Subject to any disclaimer, the term of this patent is extended or adjusted under 35 U.S.C. 154(b) by 856 days.

(21) Appl. No.: 12/484,701

(22) Filed: Jun. 15, 2009

(65) Prior Publication Data

US 2010/0217953 A1 Aug. 26, 2010

Related U.S. Application Data

(60) Provisional application No. 61/154,743, filed on Feb. 23, 2009.

(51) Int. Cl.
*G06F 12/08* (2006.01)
(52) U.S. Cl. .................. 711/216; 711/208; 711/E12.018
(58) Field of Classification Search .................. 711/216, 711/208, E12.018
See application file for complete search history.

(56) References Cited

U.S. PATENT DOCUMENTS

| | | | |
|---|---|---|---|
| 5,287,499 A | 2/1994 | Nemes | |
| 5,440,727 A | 8/1995 | Bhide et al. | |
| 5,812,398 A | 9/1998 | Nielsen | |
| 5,813,008 A | 9/1998 | Benson et al. | |
| 6,041,423 A | 3/2000 | Tsukerman | |
| 6,477,544 B1 | 11/2002 | Bolosky et al. | |
| 6,629,198 B2 | 9/2003 | Howard et al. | |
| 6,678,809 B1 | 1/2004 | Delaney et al. | |
| 6,865,577 B1 | 3/2005 | Sereda | |
| 7,003,551 B2 | 2/2006 | Malik | |
| 7,093,137 B1 | 8/2006 | Sato et al. | |
| 7,165,082 B1 | 1/2007 | DeVos | |
| 7,197,599 B2 | 3/2007 | Corrado | |
| 7,254,596 B2 | 8/2007 | De Spiegeleer | |
| 7,379,549 B2 | 5/2008 | Pelly et al. | |
| 7,424,637 B1 | 9/2008 | Schoenthal et al. | |
| 7,716,060 B2 | 5/2010 | Germeraad et al. | |
| 2003/0028783 A1 | 2/2003 | Collins et al. | |
| 2003/0120864 A1 | 6/2003 | Lee et al. | |
| 2003/0145167 A1 | 7/2003 | Tomita | |
| 2003/0188153 A1 | 10/2003 | Demoff et al. | |
| 2004/0024739 A1 | 2/2004 | Copperman et al. | |

(Continued)

FOREIGN PATENT DOCUMENTS

EP 1 818 847 A2 8/2007

OTHER PUBLICATIONS

Jenkins, Bob, "Hash Functions", Dr. Dobb's Journal, Sep. 1, 1997, available at http://www.ddj.com/architect/184410284 (5 pages).

(Continued)

*Primary Examiner* — Yong Choe

(57) ABSTRACT

A hash table system having a first hash table and a second hash table is provided. The first hash table may be in-memory and the second hash table may be on-disk. Inserting an entry to the hash table system comprises inserting the entry into the first hash table, and, when the first hash table reaches a threshold load factor, flushing entries into the second hash table. Flushing the first hash table into the second hash table may comprise sequentially flushing the first hash table segments into corresponding second hash table segments. When looking up a key/value pair corresponding to a selected key in the hash table system, the system checks both the first and second hash tables for values corresponding to the selected key. The first and second hash tables may be divided into hash table segments and collision policies may be implemented within the hash table segments.

28 Claims, 12 Drawing Sheets

U.S. PATENT DOCUMENTS

| | | | |
|---|---|---|---|
| 2004/0049700 A1 | 3/2004 | Yoshida | |
| 2004/0111557 A1 | 6/2004 | Nakatani et al. | |
| 2005/0015416 A1 | 1/2005 | Yamagami | |
| 2005/0033777 A1 | 2/2005 | Moraes et al. | |
| 2005/0114399 A1 | 5/2005 | Hosoi | |
| 2005/0262361 A1 | 11/2005 | Thibadeau | |
| 2006/0031230 A1 | 2/2006 | Kumar | |
| 2006/0106811 A1 | 5/2006 | Blumenau et al. | |
| 2006/0106884 A1 | 5/2006 | Blumenau et al. | |
| 2006/0106898 A1 | 5/2006 | Frondozo et al. | |
| 2006/0136735 A1 | 6/2006 | Plotkin et al. | |
| 2006/0143168 A1* | 6/2006 | Rossmann | 707/4 |
| 2006/0206662 A1 | 9/2006 | Ludwig et al. | |
| 2006/0224846 A1 | 10/2006 | Amarendran et al. | |
| 2006/0230244 A1 | 10/2006 | Amarendran et al. | |
| 2006/0235908 A1 | 10/2006 | Armangau et al. | |
| 2006/0248055 A1 | 11/2006 | Haslam et al. | |
| 2006/0248273 A1 | 11/2006 | Jernigan, IV et al. | |
| 2006/0265370 A1* | 11/2006 | Qian | 707/7 |
| 2006/0288161 A1 | 12/2006 | Cavallo | |
| 2007/0110044 A1 | 5/2007 | Barnes et al. | |
| 2007/0112883 A1 | 5/2007 | Asano et al. | |
| 2008/0005194 A1 | 1/2008 | Smolen et al. | |
| 2008/0229056 A1* | 9/2008 | Agarwal et al. | 711/216 |
| 2008/0243878 A1 | 10/2008 | de Spiegeleer et al. | |
| 2008/0243953 A1 | 10/2008 | Wu et al. | |
| 2008/0263363 A1 | 10/2008 | Jueneman et al. | |
| 2009/0259669 A1 | 10/2009 | Abbruzzi et al. | |
| 2010/0215175 A1 | 8/2010 | Newson et al. | |
| 2010/0217931 A1 | 8/2010 | Beaman et al. | |
| 2010/0217953 A1 | 8/2010 | Beaman et al. | |
| 2010/0228784 A1 | 9/2010 | Beaman et al. | |

OTHER PUBLICATIONS

Jenkins, Robert J., "Hash Functions for Hash Table Lookup", 1995-1997, http://www.burtleburtle.net/bob/hash/evahash.html (8 pages).

Guy, Richard G., Ficus: A Very Large Scale Reliable Distributed File System, Technical Report CSD-910018, Computer Science Department, University of California, Los Angeles, CA, Jun. 3, 1991 (125 pages).

Honicky, R.J. et al., Replication Under Scalable Hashing: A Family of Algorithms for Scalable Decentralized Data Distribution, Proceedings of the 18th International Parallel and Distributed Processing Symposim, Santa Fe, NM, Apr. 2004, pp. 1-10 (10 pages).

Microsoft IT Showcase, Single Instance Storage in Microsoft Windows Storage Server 2003 R2: A Solution for Managing Duplicate Files, Technical White Paper, May 2006, pp. 1-17 (17 pages).

Mohan, C. et al., ARIES: A Transaction Recovery Method Supporting Fine-Granularity Locking and Partial Rollbacks Using Write-Ahead Logging, Association for Computing Machinery, ACM Transactions on Database Systems, vol. 17, No. 1, Mar. 1992, pp. 94-162 (69 pages).

Satyanarayanan, M., Coda: A Highly Available File System for a Distributed Workstation Environment, IEEE Transactions on Computers, vol. 39, p. 447-459 (1990), available at http://citeseerx.ist.psu.edu/viewdoc/summary?doi=10.1.1.31.1314 (5 pages).

Weil, Sage A. et al., Ceph: A Scalable, High-Performance Distributed File System, OSDI '06: 7th USENIX Symposium on Operating Systems Design and Implementation, pp. 307-320 (14 pages).

Weil, Sage A. et al., CRUSH: Controlled, Scalable, Decentralized Placement of Replicated Data, IEEE, SC2006, Nov. 2006, Tampa, Florida (12 pages).

Wikipedia, List of file systems, Nov. 27, 2007, http//en.wikipedia.org/wiki/List_of_file_systems (7 pages).

Wikipedia, Replication (Computer Science), Nov. 27, 2007, http://en.wikipedia.org/wiki/Replication_%28computer_science%29 (5 pages).

Xin, Qin et al., Evaluation of Distributed Recovery in Large-Scale Storage Systems, Proceedings of the 13th IEEE International Symposium on High Performance Distributed Computing, Honolulu, HI, Jun. 2004 (10 pages).

Broder, A. et al. "Using Multiple Hash Functions to Improve IP Lookups" IEEE INFOCOM 2001: 20th Annual Joint Conference of the IEEE Computer and Communications Society, Anchorage, Alaska, Apr. 22-26, 2001; Proceedings, vol. 3, pp. 1454-1463.

International Business Machines Corp. (IBM) "Cache Hash Overflow Table for Computers Using Cache Memory" Technical Disclosure Bulletin, vol. 32, No. 3B, pp. 110-117 (Aug. 1, 1989).

International Search Report and Written Opinion issued in International Patent Application No. PCT/US2010/024784; Date of Mailing: Jul. 13, 2010.

International Search Report and Written Opinion issued in International Patent Application No. PCT/US2010/024787; Date of Mailing: May 18, 2010.

Kirsch, A. et al. "On the Performance of Multiple Choice Hash Tables with Moves on Deletes and Inserts" *2008 46th Annual Allerton Conference on Communication, Control, and Computing.* Allerton House, UIUC, Illinois, USA, Sep. 23-26, 2008 IEEE; ThD1.4, pp. 1284-1290.

Partial International Search Report, Annex to Invitation to Pay Fees, issued in International Patent Application No. PCT/US2010/024891; Date of Mailing: Jun. 24, 2010.

U.S. Appl. No. 12/100,962 by Abbruzzi et al., filed Apr. 10, 2008: Non-Final Office Action, dated Jul. 7, 2010.

U.S. Appl. No. 12/100,962 by Abbruzzi et al., filed Apr. 10, 2008: Final Office Action, dated Dec. 23, 2010.

U.S. Appl. No. 12/100,962 by Abbruzzi et al., filed Apr. 10, 2008: Advisory Action, dated Mar. 2, 2011.

U.S. Appl. No. 12/391,099 by Beaman et al., filed Feb. 23, 2009: Non-Final Office Action, dated Jan. 20, 2011.

International Search Report and Written Opinion issued in International Patent Application No. PCT/US2010/024889; Date of Mailing: Oct. 22, 2010.

International Search Report and Written Opinion issued in International Patent Application No. PCT/US2010/024891; Date of Mailing: Sep. 22, 2010.

Kumar, S. et al. "Segmented Hash: An Efficient Hash Table Implementation for High Performance Networking Subsystems" Proceedings of the Symposium on Architecture for Networking and Communications Systems (ANCS), Oct. 26-28, 2005, Princeton, New Jersey; pp. 91-103.

Seagate "The Benefits of Self-Encrypting Drives in the Data Center" Technology Paper, Publication No. TP590.1-0804US, Apr. 1, 2008 [online]. Retrieved from the Internet: http://www.lsi.com/campaigns/forms/security_cw/downloads/pdf/TP590.1-0804US_1r.pdf.

Wikipedia "Key derivation function" Dec. 25, 2008 [online]. Retrieved from the Internet: http://en.wikipedia.org/w/index.php?title=Key_derivation_function&oldid=260028157.

Decandia, Giuseppe et al., Dynamo: Amazon's Highly Available Key-value Store, Amazon.com, SOSP'07, Oct. 14-17, 2007, Stevenson, Washington, pp. 205-220 (16 pages).

\* cited by examiner

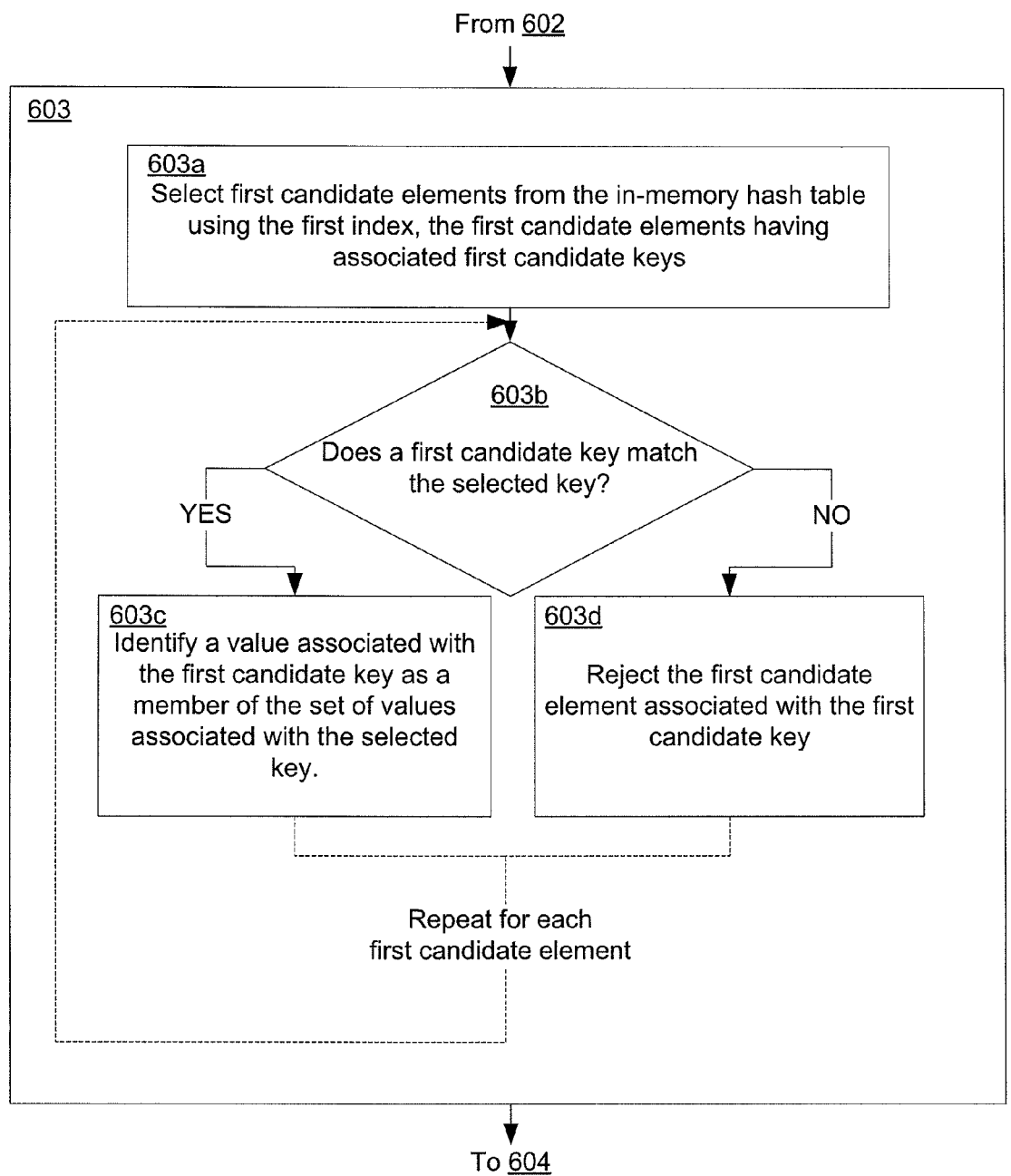

Entry 241

HYBRID HASH TABLES

RELATED APPLICATIONS

The present application claims the benefit of U.S. Provisional Application No. 61/154,743, filed Feb. 23, 2009.

BACKGROUND

A data storage system may store many billions of data objects. One challenge in creating such a system is to provide a way to locate and retrieve data objects efficiently. Typically each data object has a unique identifier that can be used to locate and retrieve the data object using some mapping from the unique identifier to the data object's location on the data storage system. One particularly good data structure for creating and maintaining such a mapping is a hash table.

A hash table is a data structure such as an array that is made up of a number of indexed elements (also known as slots or buckets). A data storage system using a hash table maps "keys" to corresponding "values" by performing a mathematical algorithm (a hash function) on the keys to calculate an "index" of the element in the hash table where the corresponding value should be located. Exemplary hash functions include the Secure Hash Algorithm (SHA-256). A key and its corresponding value are referred to as a "key/value pair." In a data storage system, the key may be the unique identifier of a particular data object stored in the data storage system; and the value may be the location of the particular data object on the data storage system, or the value may be information used to derive the location of the particular data object such as a pointer. In such systems, performing a hash function on the unique identifier of a data object calculates the index in the hash table where the system may find the location (i.e. a memory address) of that data object so that it can be retrieved.

An element in a hash table may be empty or may contain some value indicating that it is empty (i.e. null or 0), meaning that there is no key/value pair using that location in the hash table. Otherwise, an element in a hash table may contain an entry or reference an entry. In "closed hashing" or "open addressing" systems, each element provides information about a single key/value pair. For example, in a closed hashing system, the element may contain a value. Adding entries to the elements of a hash table is referred to herein as "inserting" entries.

Locating and evaluating an element in the hash table may be referred to as "probing." Systems generally evaluate whether another entry has been previously inserted into an element before inserting a new entry into that element because collisions may occur. Collisions may occur because the hash function can return the same index for two keys, and thus the system may attempt to insert a second entry into the same element in a hash table. Ideally, hash functions map each possible key to a different element in the hash table, but this is not always achievable. Although better hash functions minimize the number of collisions, when collisions do occur, the system may perform a collision resolution technique (or collision policy) to accommodate collisions.

Using a collision policy, when an element of the hash table corresponding to the calculated index has a previously inserted entry (or when the element contains an entry that is non-zero, non-null, or not empty depending on the implementation), the system probes the hash table to find an element without a previously inserted entry or with a zero, null, or empty entry (an "unused element"). When using linear probing, the system probes the elements in the hash table sequentially so that if the next sequential element is unused, the new entry is inserted into the next sequential element. Other collision resolution techniques include quadratic probing and double hashing.

One benefit to using a hash table data structure is that the look up time (the time to locate the value when the key is known) is generally constant regardless of the number of elements in the hash table. Therefore, a hash table implementation remains efficient even when the number of elements grows extremely large, making hash tables especially useful in large data storage systems for looking up the locations of the individual stored data objects. However, because a collision may have occurred during the insertion of entries, the system may have inserted an entry into an element in accordance with the collision policy (rather than into the entry corresponding to the index resulting from the hash function). Thus, when performing look up operations based on an index calculated from a hash function on a key, the entry at the calculated index may not belong to the key. The system must therefore perform additional steps to ensure that it has found the correct entry.

Hash tables may be stored in-memory (i.e. in RAM), but larger hash tables may require storage on-disk because on-disk storage is lower cost. However, storing hash tables on-disk can be undesirable when considering throughput because disk I/O operations are more costly than memory I/O operations.

SUMMARY OF EXEMPLARY EMBODIMENTS

Methods and systems are disclosed that relate to inserting a new entry in a hash table system in a data storage system. Methods and systems are also disclosed that relate to identifying a value, or set of values, associated with a selected key. In one embodiment, a method for inserting a new entry in a hash table system may comprise providing the hash table system having a first hash table and a second hash table. The method may further comprise computing a first index for the new entry, the first index corresponding to a first element in the first hash table, and computing a second index for the new entry, the second index corresponding to a second element in the second hash table. The method may next insert a first entry corresponding to the new entry into the first element in the first hash table; and, when the first hash table reaches a threshold load factor, the first entry may be flushed from the first hash table. Flushing may comprise inserting a value associated with the new entry into the second element in the second hash table, and removing the first entry from the first element in the first hash table. In some embodiments, the first hash table may be an in-memory hash table, and the second hash table may be an on-disk hash table.

In one embodiment, the first entry may be the new entry. In other embodiments, the first entry may comprise the second index and the value associated with the new entry. The method may use the second index to locate the second element in the second hash table. In alternative embodiments, the method may re-compute the second index for the new entry and use the re-computed index to locate the second element in the second hash table. Computing the first and second indices may comprise performing one or more hash functions. The hash function may be performed on a key associated with the new entry to be inserted into the hash table system.

In one exemplary embodiment, the method may compute the second index by performing a hash function on a key associated with the new entry and may compute the first index by dividing the second index by a ratio of a size of the second hash table to a size of the first hash table. In some embodiments, the key associated with the new entry may be a unique identifier of a data object stored in the data storage system. Further, in some embodiments, the ratio of the second hash table size to the first hash table size may be rounded to an integer. In alternative embodiments, computing the second index may further comprise computing a first modulus of the hashed key and the size of the second hash table, and computing the first index may further comprise computing a second modulus of the divided second index and the size of the second hash table.

In yet another embodiment, inserting the first entry corresponding to the new entry into the first element in the first hash table may further comprise checking whether the first element contains a previously inserted entry. In such an embodiment, when the first element contains the previously inserted entry, the method may execute a collision policy to find an unused element and substitute the unused element for the first element. In some embodiments, the collision policy may be a linear probing method. Further, in some embodiments, the first hash table may be divided into first hash table segments, and the collision policy may be executed within a first hash table segment such that the unused element is found within the first hash table segment. In further such embodiments, wherein the collision policy is a linear probing method, the method may execute the linear probing method from the beginning of the first hash table segment.

Similarly, in some embodiments, inserting the second entry into the second element in the second hash table may further comprise checking whether the second element contains a previously inserted entry. Further, the second hash table may be divided into second hash table segments, and a collision policy may be executed within the second hash table segment such that the unused element is found within the second hash table segment.

In embodiments in which the first hash table is divided into a plurality of first hash table segments and the second hash table is divided into a plurality of second hash table segments (each corresponding to one of the first hash table segments), the method may flush all entries stored in one of the first hash table segments into its corresponding second hash table segment before flushing the entries stored in another of the first hash table segments. Further, in some such embodiments, the system may keep a record of which hash table segments are being flushed.

In yet another embodiment, a method for identifying a value associated with a selected key may comprise providing a computer system having a processor, an in-memory hash table, and an on-disk hash table. The method may further comprise checking, by the processor, the in-memory hash table for an entry corresponding to the selected key, wherein the entry corresponding to the selected key identifies the value associated with the selected key. When the entry corresponding to the selected key is not found in the in-memory hash table, the processor may check the on-disk hash table for the entry corresponding to the selected key. In some embodiments, the method may be implemented in a data storage system and the selected key may be a unique identifier of a data object stored in the data storage system, and the value may indicate a location in the data storage system where the data object is stored.

In still other embodiments, a method for identifying a set of values associated with a selected key may comprise providing a computer system having a processor, an in-memory hash table, and an on-disk hash table. The method may further comprise computing, by the processor, a first index for the selected key, and selecting first candidate elements from the in-memory hash table using the first index, the first candidate elements having associated first candidate keys. The method may also compute a second index for the selected key, and select second candidate elements from the on-disk hash table using the second index, the second candidate elements having associated second candidate keys. The method may then examine the first and second candidate elements to determine whether their corresponding keys match the selected keys. If the corresponding key matches the selected key, the method may identify a value associated with the corresponding first or second candidate element as a member of the set of values associated with the selected key.

In some embodiments, the method may select the first candidate elements from the in-memory hash table by selecting the element corresponding to the first index in the in-memory hash table and selecting the next element in the in-memory hash table if the next element has a previously inserted entry. Similarly, the method may select the second candidate elements from the on-disk hash table by selecting the element corresponding to the second index in the on-disk hash table and selecting the next element in the on-disk hash table if the next element has a previously inserted entry.

In still other embodiments, the in-memory hash table and the on-disk hash table may be divided into a plurality of in-memory hash table segments and on-disk hash table segments, respectively. In such embodiments, the next element in the in-memory hash table may be found within a first of the in-memory hash table segments, and, similarly, the next element in the on-disk hash table may be found within a first of the on-disk hash table segments.

In a further embodiment, the selected key may be associated with a discriminator value, and the method may, when selecting the first candidate elements, reject elements in the in-memory hash table containing an entry having a first discriminator value that is different than the selected discriminator value. Further, when selecting the second candidate elements, the method may reject elements in the on-disk hash table containing an entry having a second discriminator value that is different than the selected discriminator value.

One of ordinary skill in the art will appreciate that the methods described herein may be embodied in various components of a computer system with at least one associated disk drive. Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

FIG. 1b illustrates an exemplary disk drive in the data storage system of FIG. 1a;

FIG. 2b illustrates exemplary entries in the hash table system of FIG. 2a;

FIG. 6b illustrates an exemplary method for checking an in-memory hash table for entries corresponding to a selected key;

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Within the concept of this specification, a "data storage system" broadly refers to any data storage devices or memories such as hard disk drives, databases, or enterprise storage systems. A data storage system further includes any processors, programs, and applications accessing and/or managing the data storage devices or memories as well as communication links between the data storage devices or memories, and communication links between the processors, programs, and applications and the data storage devices or memories. A data storage system may be an archival data storage system, in which data is frequently stored but infrequently accessed. The methods and systems disclosed herein are particularly useful in such archival data storage systems and provide the function of a conventional hash table while reducing the number of disk read and write operations for inserting new entries into elements in a hash table designed to store information regarding the location of the stored data objects. In archival data storage systems, a dominant activity may be inserting these new entries and therefore, the reduction in disk read and write operations for such insertions can have a significant effect on the archival data storage system's throughput.

Figure 1A:
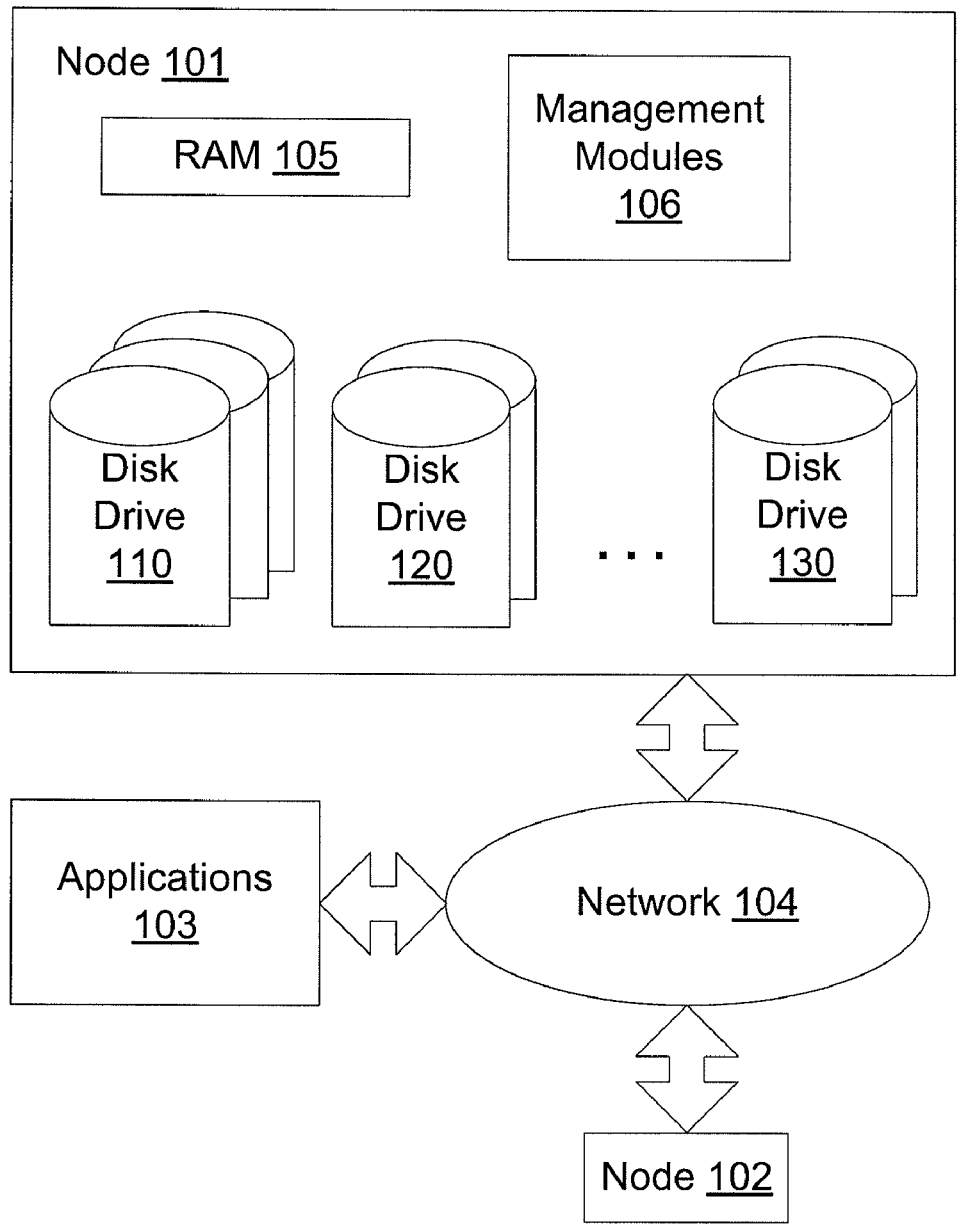
FIG. 1a illustrates an exemplary data storage system.

FIG. 1a shows an exemplary embodiment of a data storage system 100 having a node 101, a node 102, and applications 103. As shown in data storage system 100, one or more of the nodes 101, 102, and applications 103 may be operatively connected to one another via a network 104. Network 104 provides communications between various entities in data storage system 100, such as node 101, node 102, and applications 103. Network 104 may be a shared, public, or private network, may encompass a wide area or local area network, and may be implemented through any suitable combination of wired and/or wireless communication networks. Furthermore, network 104 may comprise an intranet or the Internet.

As used herein, a "node" refers to a subset of a data storage system having at least one associated disk drive. An example of a node is a server having one or more hard disk drives for storing data. The nodes in a data storage system may be in the same or different geographical locations.

As used herein, a "disk drive" refers to any persistent memory accessible by a node, such as an internal or external hard drive. A disk drive may be a RAID drive made up of one or more physical storage devices. For simplicity, only three disk drives are shown in node 101 of data storage system 100. Disk drives 110, 120, and 130 are associated with node 101. Data and metadata stored on disk drives is referred to herein as "on-disk." Data and metadata stored in main memory (i.e. RAM) is referred to herein as "in-memory." Node 101 contains RAM 105, which may comprise any type of Random Access Memory or Random Access Memory Modules, such as DRAM.

Each node may have management modules which include one or more processors, memory, and hardware, software, or firmware used to store and execute instructions to manage the data stored on the disk drives of that node. For example, management modules 106 may implement algorithms for managing the data stored in disk drives 110, 120 and 130. Management modules 106 may also utilize RAM 105 in addition to disk drives 110, 120 and 130 to perform its tasks. The methods disclosed herein may be implemented by one or more of the management modules 106 and additional management modules not depicted for simplicity. Management modules 106 may have sub-modules. In alternative embodiments, management modules external to the nodes or a combination of management modules internal to the nodes, such as management modules 106, and management modules external to the nodes communicating with the nodes via network 104 may implement the methods disclosed herein. Further, in alternative embodiments, memory used by the management modules and instructions implemented by the management modules may be stored in a location on the data storage system external to the management modules themselves.

Applications 103 may be any programs communicating with nodes 101 and 102, such as those retrieving data from the disk drives at the nodes. An exemplary application is a search engine, whereby a user can search for particular data objects (such as those shown in FIG. 1b) stored in the data storage system 100.

Figure 1B:
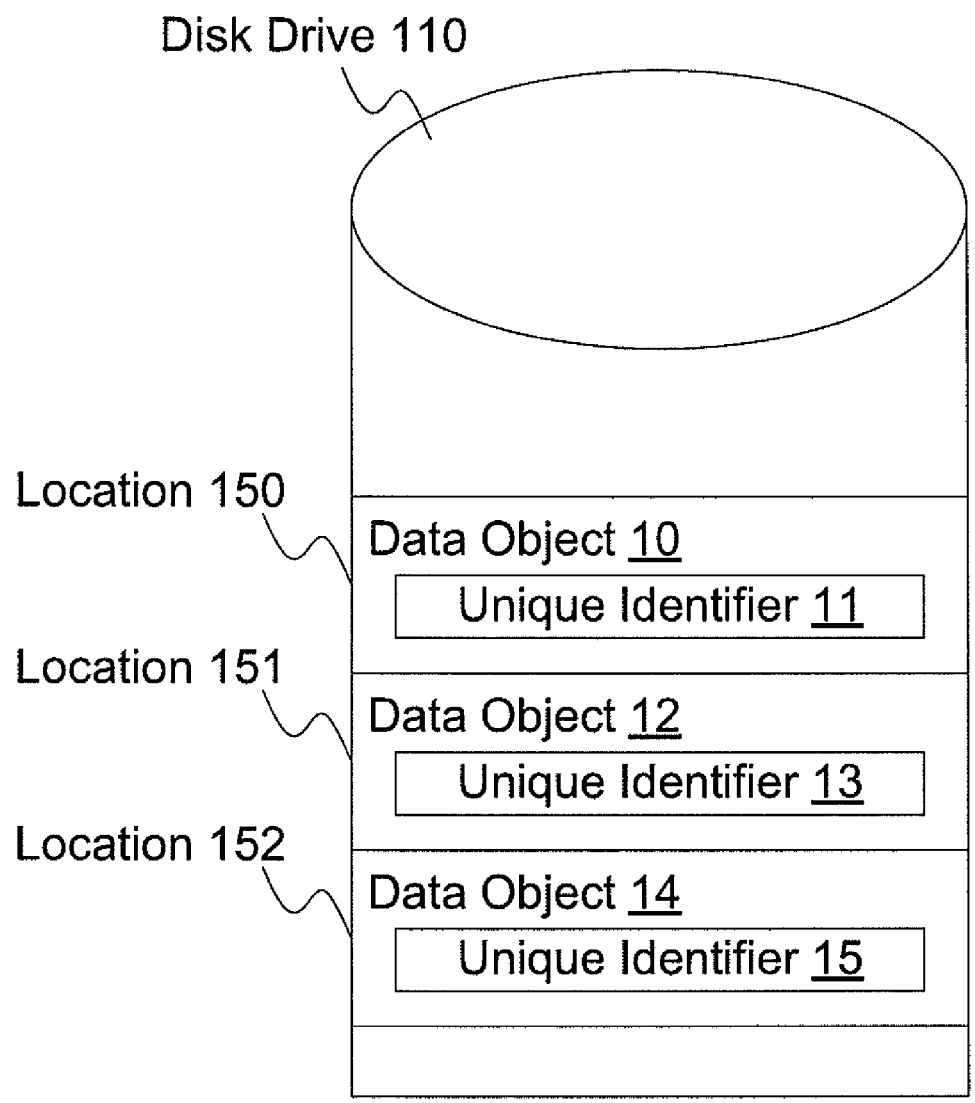

FIG. 1b shows an exemplary disk drive 110 from FIG. 1a in more detail. Although for simplicity FIG. 1b shows only three data objects 10, 12, and 14 as being stored on disk drive 110, embodiments of the systems and methods described herein may be implemented using disk drives having any number of stored data objects. Locations 150, 151, 152 represent the locations of data objects 10, 12, 14 on disk drive 110. Locations 150, 151, 152 may comprise memory addresses having any format that can be understood by management modules 106 including explicit or relative addressing schemes.

Each data object 10, 12, 14 is associated with a unique identifier. In FIG. 1b, data object 10 is associated with unique identifier 11; data object 12 is associated with unique identifier 13; and data object 14 is associated with unique identifier 15. Unique identifiers allow the data storage system 100 to identify and locate the associated data object. The methods and systems disclosed herein may be used to determine the locations 150, 151, and 152 of data objects 10, 12, and 14 in data storage system 100.

Figure 2A:
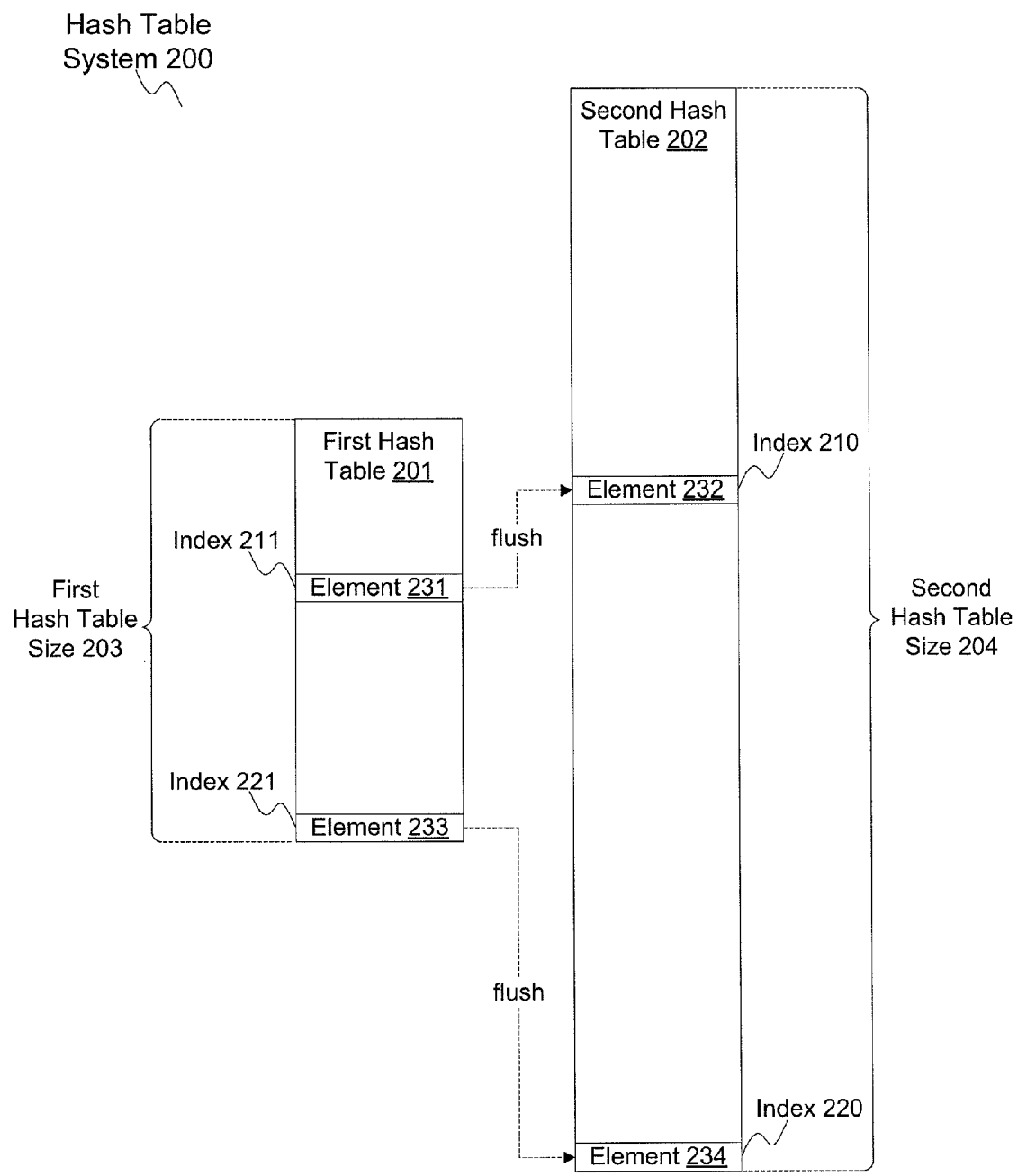
FIG. 2a illustrates an exemplary hash table system.

FIG. 2a shows an exemplary hash table system 200. As used herein, a "hash table system" refers to portions of a data storage system that may be used to implement a hash table to map key/value pairs. For example, hash table system 200 may be used for determining locations 150, 151, 152 of data objects 10, 12, 14, shown in FIG. 1b, in data storage system 100 shown in FIG. 1a. Hash table systems may employ multiple hash tables to map key/value pairs. An exemplary hash table system comprises a "hybrid hash table," which may refer to any hash table system having both an in-memory hash table and an on-disk hash table, consistent with the methods and systems disclosed herein. Data storage system 100 may store an on-disk hash table on a single disk drive, such as disk drive 110, or may store the on-disk hash table across multiple disk drives on the same node or across multiple disk drives on different nodes.

In FIG. 2a, hash table system 200 has two exemplary hash tables: first hash table 201 and second hash table 202. In some embodiments, first hash table 201 may be an in-memory hash table, such as in-memory hash table 301 shown in FIG. 3, and second hash table 202 may be an on-disk hash table, such as on-disk hash table 302 also shown in FIG. 3. In such an embodiment, the on-disk hash table 302 may comprise a large, contiguous file having fixed-length records that serve as elements. These fixed-length records may be at least large enough to hold a value associated with a key. Each record may, for example, be sufficient to hold a 64-bit integer. In alternative embodiments, hash table system 200 may instead comprise two hash tables stored either in-memory or on-disk, where the first hash table 201 is stored in faster memory and the second hash table 202 is stored in slower memory. In yet other embodiments, first hash table 201 may be stored locally and second hash table 202 may be stored remotely. In certain embodiments, second hash table 202 may have a second hash table size 204 larger than the first hash table size 203 corresponding to first hash table 201. Using hash table system 200 in lieu of a single on-disk hash table, remote hash table, or slower-memory hash table results in faster throughput in systems attempting to insert a large number of entries into the hash table elements.

FIG. 2a shows first hash table 201 having two elements 231 and 233 for simplicity, but first hash table 201 may have any fixed number of elements. In this illustrative embodiment, first hash table 201 is rebuilt with a new, larger fixed number of elements when necessary to allow for more entries. In alternative embodiments, first hash table 201 may allow for expansion by known methods when necessary to allow for more entries.

Element 231 is located at index 211 in first hash table 201, and element 233 is located at index 221 in first hash table 201. Similarly, element 232 is located at index 210 in second hash table 202, and element 234 is located at index 220 in second hash table 202. Although only two elements are shown in second hash table 202, second hash table 202 may have any fixed number of elements. In this illustrative embodiment, second hash table 202 is rebuilt with a new, larger fixed number of elements when necessary to allow for more entries. In alternative embodiments, second hash table 202 may allow for expansion by known methods when necessary to allow for more entries.

Indices 211, 221, 210, and 220 correspond to quantities that can be calculated using a hash function, but may also correspond to quantities derived from the results of a hash function. In one exemplary embodiment, the hash table system 200 maps key/value pairs corresponding to unique identifiers of data objects and locations on disk drives in data storage system 100. One such key/value pair may be unique identifier 11 and location 150 corresponding to data object 10 shown in FIG. 1b. In this example, hash table system 200 would apply the hash function to the unique identifier 11 to compute an index of an element in the first hash table 201 where information relating to location 150 would be stored. The following is an exemplary calculation of index 211:

Index 210=[Hash (unique identifier 11)] MOD s
Index 211=Index 210/r
where:
the applied hash function is SHA-256;
s=second hash table size 204;
c=first hash table size 203; and
r=s/c In one illustrative embodiment, the quantity r, corresponding to the ratio of the second hash table size 204 to the first hash table size 203 may be rounded to the nearest integer. In some embodiments, the rounding may be configured to always round the quantity up to the nearest integer. In other embodiments, the rounding may be configured to always round the quantity down to the nearest integer. In yet other embodiments, the rounding may be configured to round up or down depending on the decimal value. In each of the foregoing embodiments, however, the rounding policy should be consistently applied.

As discussed in detail below, when the first hash table 201 reaches a threshold load factor, the hash table system 200 may "flush" entries into the second hash table 202. For example, when first hash table 201 reaches a threshold load factor, entries inserted into elements 231, 233 in first hash table 201 may be flushed into elements 232, 234, respectively, or into other elements not depicted in second hash table 202. The threshold load factor represents a selected ratio of elements having inserted entries (versus unused entries) to the size of the hash table. Because the load factor of a hash table represents the number of elements in use compared to the total capacity of the hash table, when a load factor in a hash table becomes too high, collisions are more likely to occur for subsequent insertions of entries into the hash table. Thus, the threshold load factor should be chosen such that collisions for new entries are minimized. In some embodiments, the threshold load factor may be between 50% to 70%. In one illustrative embodiment, the threshold load factor is ⅔, meaning that when the first hash table 201 is ⅔ full (i.e. ⅔ of the elements in the first hash table 201 contain entries corresponding to a key/value pair, and the remaining ⅓ of the elements in the first hash table 201 are unused), first hash table 201 has reached its threshold load factor.

Figure 2B:
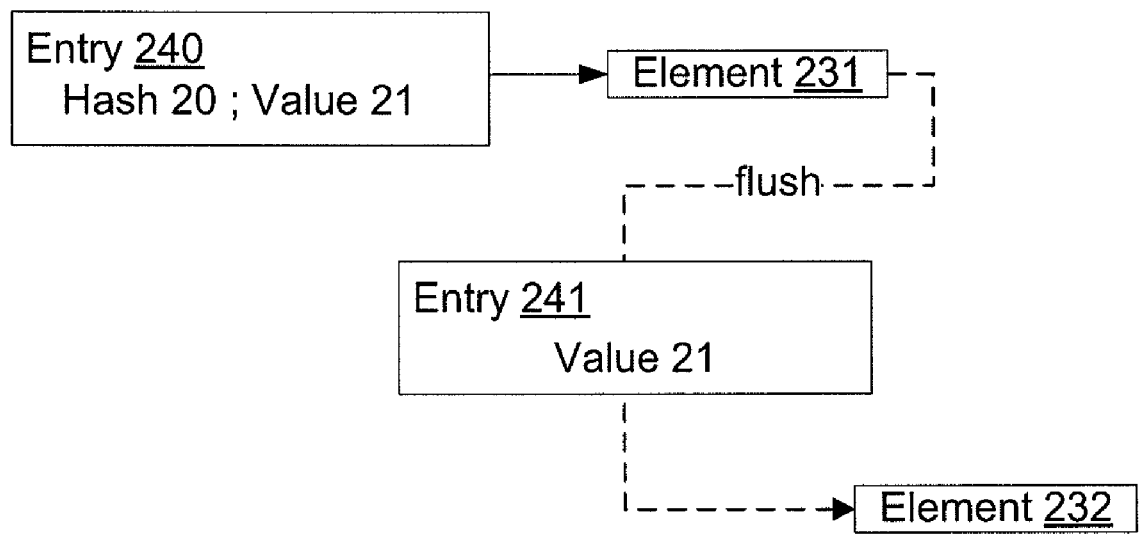

Flushing, as used herein, refers to the reading of entries from a first hash table and the writing of data relating to those entries in another location on a data storage system, such as in a second hash table. For example, flushing may comprise removing entries from the first hash table 201, and inserting those entries into the second hash table 202. Flushing may alternatively comprise inserting entries into the second hash table 202 having a different format than the entries in the first hash table 201. One example of such different entry formats is depicted in FIG. 2b and described below. Removing entries from the elements in the first hash table 201 allows the first hash table 201 to be ready to receive newly inserted entries.

During a flush operation, entries in the first hash table 201 must be merged with entries in the second hash table 202, meaning that entries from the first hash table 201 must be inserted into elements in the second hash table 202, where some elements in the second hash table 202 may already contain previously inserted entries. Thus, flushing may require that the hash table system 200 implement a collision policy when inserting entries into the second hash table 202 to avoid inserting entries into elements in second hash table 202 that already contain entries. Exemplary collision policy implementations are discussed in more detail below.

An entry may comprise data portions of a single data type or combination of data types including strings, integers, or pointers to data. FIG. 2b shows an exemplary entry 240 having two data portions: hash 20 and value 21, which are stored in two 64-bit integer fields. Value 21 represents some value associated with the entry 240, such as location 150 associated with data object 10 in FIG. 1b. Hash 20 represents the quantity returned by performing a hash function on a key associated with the entry 240. The hash function may comprise, for example, computing the SHA-256 digest of the content of a data object. For example, hash 20 may represent the output of a SHA-256 hash function on the actual data comprising data object 10 in FIG. 1b. Performing the hash function on the key may further comprise applying a second hash function on that result. For example, the second hash function may comprise the Newhash function by Robert J. Jenkins, Jr. (Bob Jenkins, *Hash functions*. Dr. Dobbs Journal, Sep. 1, 1997). In this example, hash 20 would represent the result of the Newhash function performed on the SHA-256 result of the SHA-256 hash of the actual data comprising data object 10. The following pseudo code shows the aforementioned illustrative embodiment:

hash 20=Newhash[SHA-256 (data object 10)]

In FIG. 2b, the system inserts entry 240 into element 231. Inserting an entry into the element means that the data portions associated with the entry are stored in an element in a hash table. For example, hash 20 and value 21 would be stored in element 231 in first hash table 201. Further, when first hash table 201 reaches its threshold load factor, the system flushes entry 240. In the exemplary embodiment shown in FIG. 2b, when entry 240 is flushed from element 231 in first hash table 201, entry 241 is inserted into element 232 in second hash table 202. In the illustrated exemplary embodiment, entry 241 comprises value 21, but in other embodiments, it may comprise the same data portions as entry 240. In one illustrative embodiment, hash 20 may be directly used to identify the index of element 232 in second hash table 202 during the flushing process so that no further calculation of indices is necessary. In other embodiments, entry 240 may not contain hash 20, and the value 21 in entry 240 may be used during the flushing process to look up the key (unique identifier 11) and the system may re-compute hash 20 using the key. In deciding between these embodiments, a system designer may consider the relative cost of storing hash 20 in the first hash table 201 versus the cost of looking up the key and re-computing the hash 20.

Figure 3:
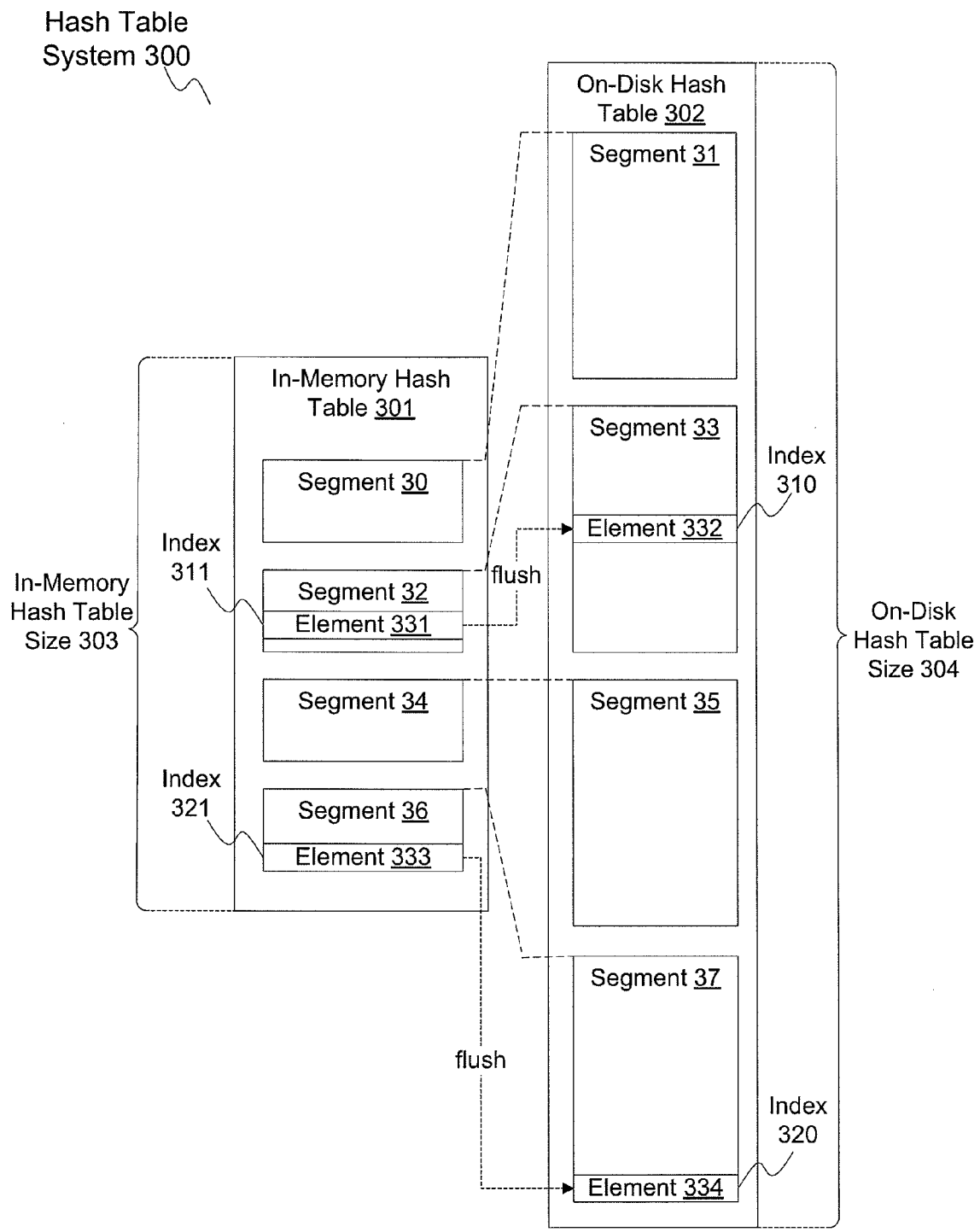
FIG. 3 illustrates another exemplary hash table system.

FIG. 3 shows an exemplary hash table system 300 comprising an in-memory hash table 301 and an on-disk hash table 302. In-memory hash table 301 is divided into non-overlapping, fixed-length hash table segments 30, 32, 34 and 36. Similarly, on-disk hash table 302 is divided into fixed length hash table segments 31, 33, 35, and 37. In one illustrative embodiment, in-memory hash table segments are the same size so that the in-memory hash table size 303 of in-memory hash table 301 is an integer multiple of the size of one of the in-memory hash table segments 30, 32, 34, 36. Similarly, in the illustrative embodiment, the on-disk hash table segments are the same size so that the on-disk hash table size 304 of the on-disk hash table 302 is an integer multiple of the size of one of the on-disk hash table segments 31, 33, 35, 37. In certain embodiments, on-disk hash table 302 may have a size 304 larger than the in-memory hash table size 303 corresponding to in-memory hash table 301. Likewise, in-memory hash table segments 30, 32, 34, and 36 may be smaller than on-disk hash table segments 31, 33, 35, and 37. In such embodiments, the size of on-disk hash table segments 31, 33, 35, and 37 may be integer multiples of the corresponding in-memory hash table segments 30, 32, 34, and 36.

In exemplary hash table system 300, each in-memory hash table segment corresponds to an on-disk hash table segment. For example: in-memory hash table segment 30 corresponds to on-disk hash table segment 31; in-memory hash table segment 32 corresponds to on-disk hash table segment 33; in-memory hash table segment 34 corresponds to on-disk hash table segment 35; and in-memory hash table segment 36 corresponds to on-disk hash table segment 37. In one embodiment, during a flush operation, exemplary hash table system 300 loads an on-disk hash table segment into RAM so that the elements in a corresponding in-memory hash table segment can be merged with the elements in the on-disk hash table segment and the combined result can be written into the on-disk hash table segment. For this reason, in such embodiments, on-disk hash table segment size may be fixed as large as possible while remaining small enough for the on-disk hash table segment to fit into RAM. In alternative embodiments, the entire on-disk hash table may be loaded into RAM during a flush operation. In certain embodiments, hash table system 300 may implement the in-memory hash table segments and on-disk hash table segments as discrete, separate hash tables as opposed to sub-divided larger hash tables.

Hash table system 300 may perform a flush operation sequentially, flushing all of the entries from one in-memory hash table segment into its corresponding on-disk hash table segment before flushing the entries in other in-memory hash table segments into their corresponding on-disk hash table segments. For example, during a flush operation, hash table system 300 may first flush all entries in segment 30 into segment 31, and only after all entries in segment 30 are flushed into segment 31, the hash table system 300 may flush the entries in other segments. Using this implementation, hash table system 300 only reads one on-disk hash table segment into memory at a time to facilitate merging the entries from the in-memory hash table segment into the corresponding on-disk hash table segment.

In one illustrative embodiment, hash table system 300 implements a locking policy when a flush operation is in progress so that new entries are prevented from being inserted during the flush operation. A locking policy may be especially useful when a flush operation takes a long time to complete. For example, when in-memory hash table segment 30 is being flushed into on-disk hash table 302, new entries are not allowed to be inserted into segment 30. In another illustrative embodiment, hash table system 300 may also record which hash table segments are participating in the flush operation. For example, when entries are being flushed into segment 33, the hash table system 300 may store some indicator that segment 32 and 33 are participating in a flush operation. In this way, if data storage system 100 attempts to read an entry from those segments, hash table system 300 can be designed to wait until the completion of the flush operation for segments 32 and 33, or hash table system 300 can otherwise indicate that the result from the look up process may not be up-to-date. One example of when such an event may occur is when data storage system 100 attempts to use hash table system 300 to implement a look up function to locate a data object corresponding to the entry in element 332. The aforementioned indicator may alert a user to the pendency of a flush operation or may contain information identifying either the in-memory hash table segment 32, the on-disk hash table segment 33, or both.

Figure 4:
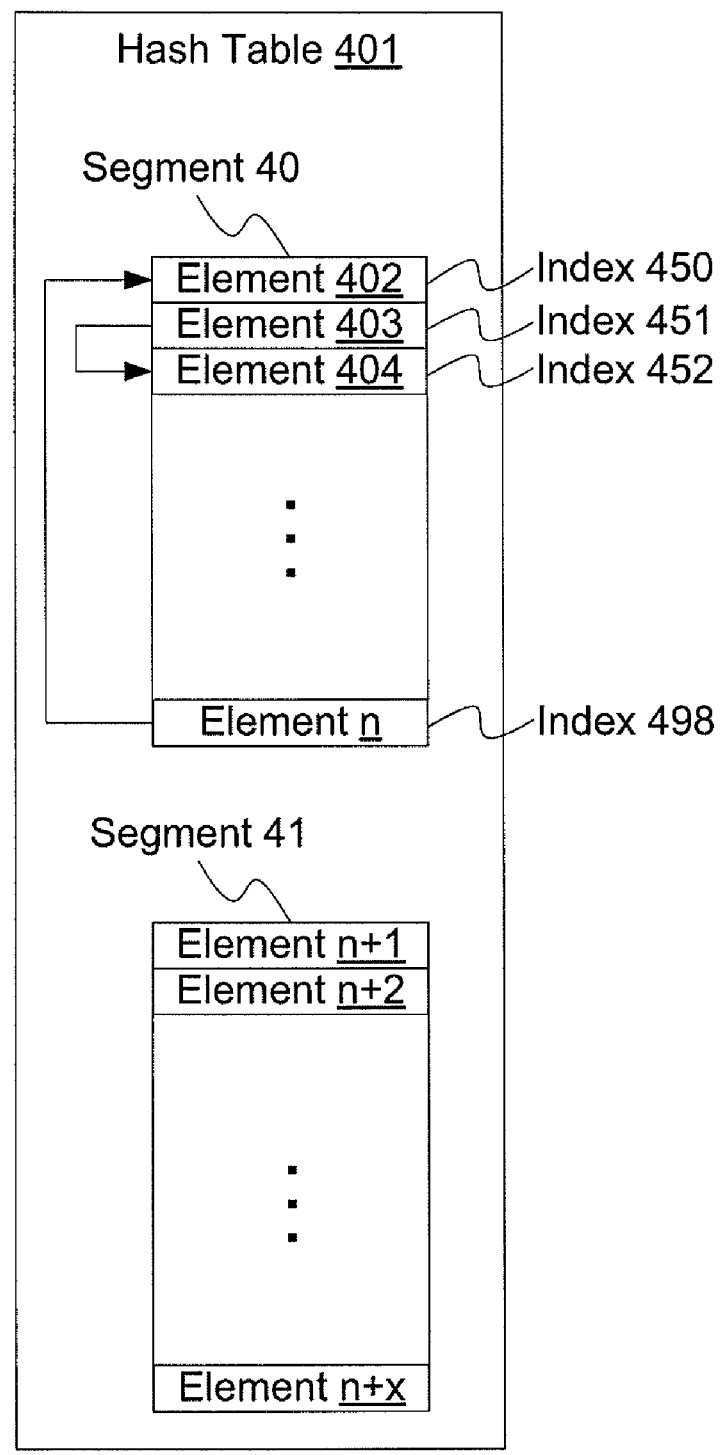
FIG. 4 illustrates an exemplary hash table having hash table segments.

FIG. 4 shows an exemplary hash table 401 having contiguous hash table segments 40 and 41 in which a collision policy may be used to facilitate inserting of new entries. Segment 40 has N elements, including element 402, 403, 404, . . . to element n, which correspond to indices 450, 451, 452, . . . to index 498, respectively. Segment 41 has n+x elements, beginning with elements n+1 and n+2. In one exemplary embodiment using hash table 401, an exemplary hash table system may be designed to implement a linear probing policy to resolve collisions. For example, if the calculated index for inserting a new entry is index 451, and element 403 corresponding to index 451 already contains a previously inserted entry, then the hash table system would attempt to insert the new entry into the next sequential element, which is element 404. Such linear probing would continue until an unused element is found.

In one illustrative embodiment, the collision policy may be designed to execute only within one hash table segment. For example, if the collision policy is a linear probing method, and the calculated index for inserting a new entry is the index 498 corresponding to element n, and element n already contains a previously inserted entry, the collision policy should not result in an insertion of the new entry into element n+1 because element n+1 is not within segment 40. Instead, the collision policy may be designed to next test the element 402, which is the first element in segment 40, as a candidate for insertion of the entry. In such an embodiment, a linear probing method may be designed to continue sequentially from element 402 at the beginning of the segment so that if element 402 also contained a previously inserted entry, the hash table system would check element 403, and so on until an unused entry is found.

One of ordinary skill in the art will appreciate that various collision policies and hash functions may be applied while remaining consistent with the features and principles disclosed herein.

Inserting a Key/Value Pair

The following pseudo-code demonstrates an exemplary function for inserting a key/value pair into a hash table system having an in-memory hash table 301, represented by the array memelements[index], and an on-disk hash table 302.

```
compute h = hashFunction (key)
compute index = (h MOD s) / r
while entries not exhausted {
    if memelements[index] is empty {
        insert entry containing h, value into memelements[index]
        break from loop
    } else {
        index = nextMemProbe(index)
    }
}
if load factor has reached threshold {
    schedule flush operation for moving entries into the on-disk hash table
}
``` where:
index = the index of the memelements hash table
s = on-disk hash table size 304;
c = in-memory hash table size 303;
r = s / c In one illustrative embodiment, the quantity r, corresponding to the ratio of the on-disk hash table size 304 to the in-memory hash table size 303 may be rounded to the nearest integer. In some embodiments, the rounding may be configured to always round the quantity up to the nearest integer. In other embodiments, the rounding may be configured to always round the quantity down to the nearest integer. In yet other embodiments, the rounding may be configured to round up or down depending on the decimal value. In each of the foregoing embodiments, however, the rounding policy should be consistently applied.

In the above pseudo code, the nextMemProbe(index) operation implements the selected collision policy. For example, for linear probing within a segment, as described above, nextMemProbe(index) could be implemented as follows:

```
int nextMemProbe(index)
    if index + 1 is at the end of the current segment {
        return index of beginning of segment
    } else {
        return index + 1
    }
```

In some embodiments, the index may be implemented as the offset from the beginning of the hash table segment.

Figure 5A:
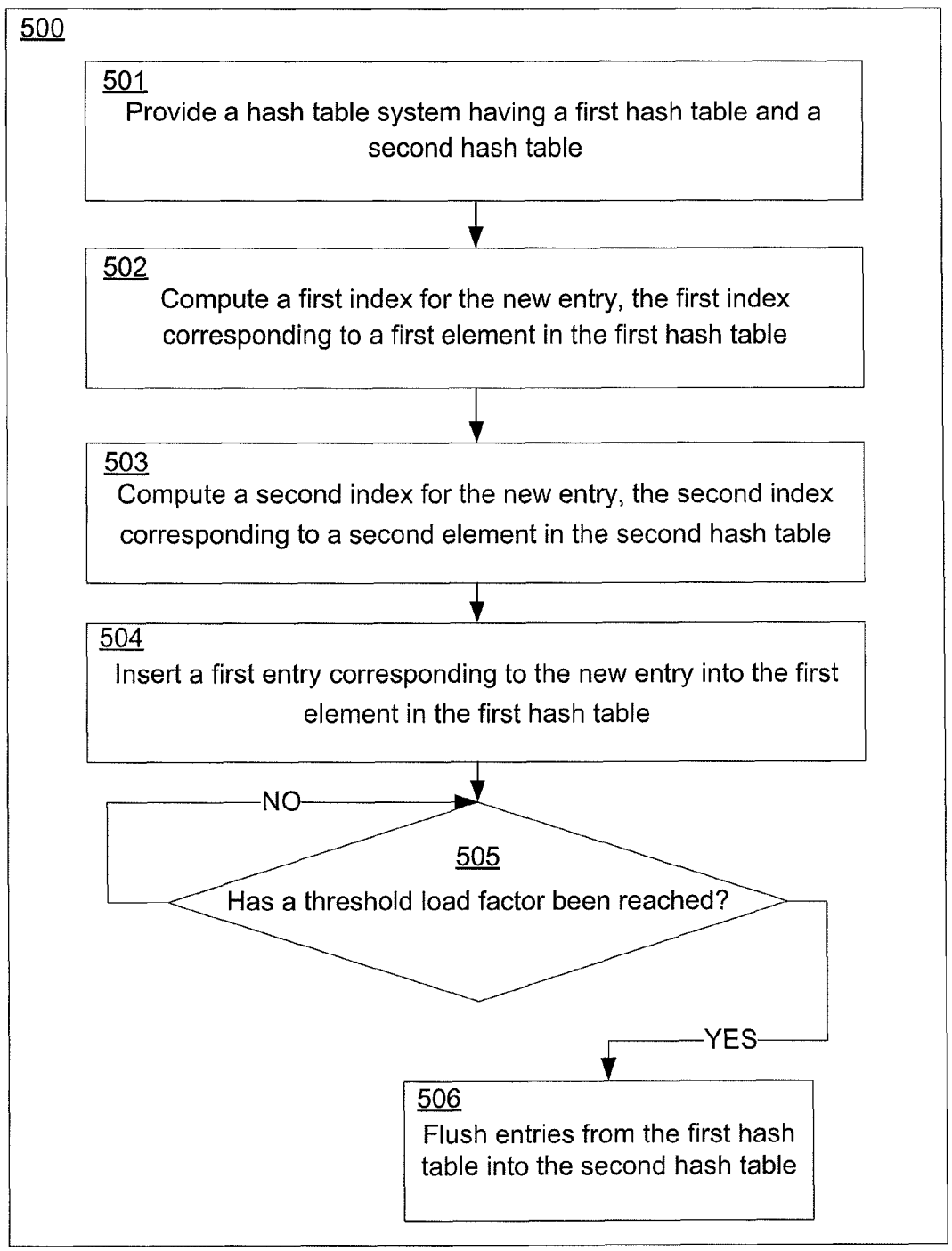
FIG. 5a illustrates an exemplary method for inserting a new entry in a hash table system.

FIG. 5a illustrates an exemplary method 500 for inserting a new entry in a hash table system, which may be implemented in a software module or modules, such as in one or more of the management modules 106 depicted in FIG. 1a. For example, exemplary method 500 may be performed by an insertion module comprising one or more modules in management modules 106. The method may be performed using a hash table system, such as the hash table system 200 depicted in FIG. 2a. In stage 501, the management modules 106 provide a hash table system having a first hash table and a second hash table. In stage 502, a first index computing module computes a first index for the new entry, the first index corresponding to a first element in the first hash table. In stage 503, a second index computing module computes a second index for the new entry, the second index corresponding to a second element in the second hash table. In stage 504, a first entry insertion module inserts a first entry corresponding to the new entry into the first element in the first hash table. When a threshold load factor associated with the first hash table is reached, an entry flushing module flushes entries from the first hash table into the second hash table. Alternatively, stage 506 may comprise the management modules 106 scheduling the flushing of entries from the first hash table into the second hash table. The exemplary method may be performed in any hash table system having two hash tables, such as in exemplary hash table system 200 in FIG. 2a or in exemplary hash table system 300 in FIG. 3.

Figure 5B:
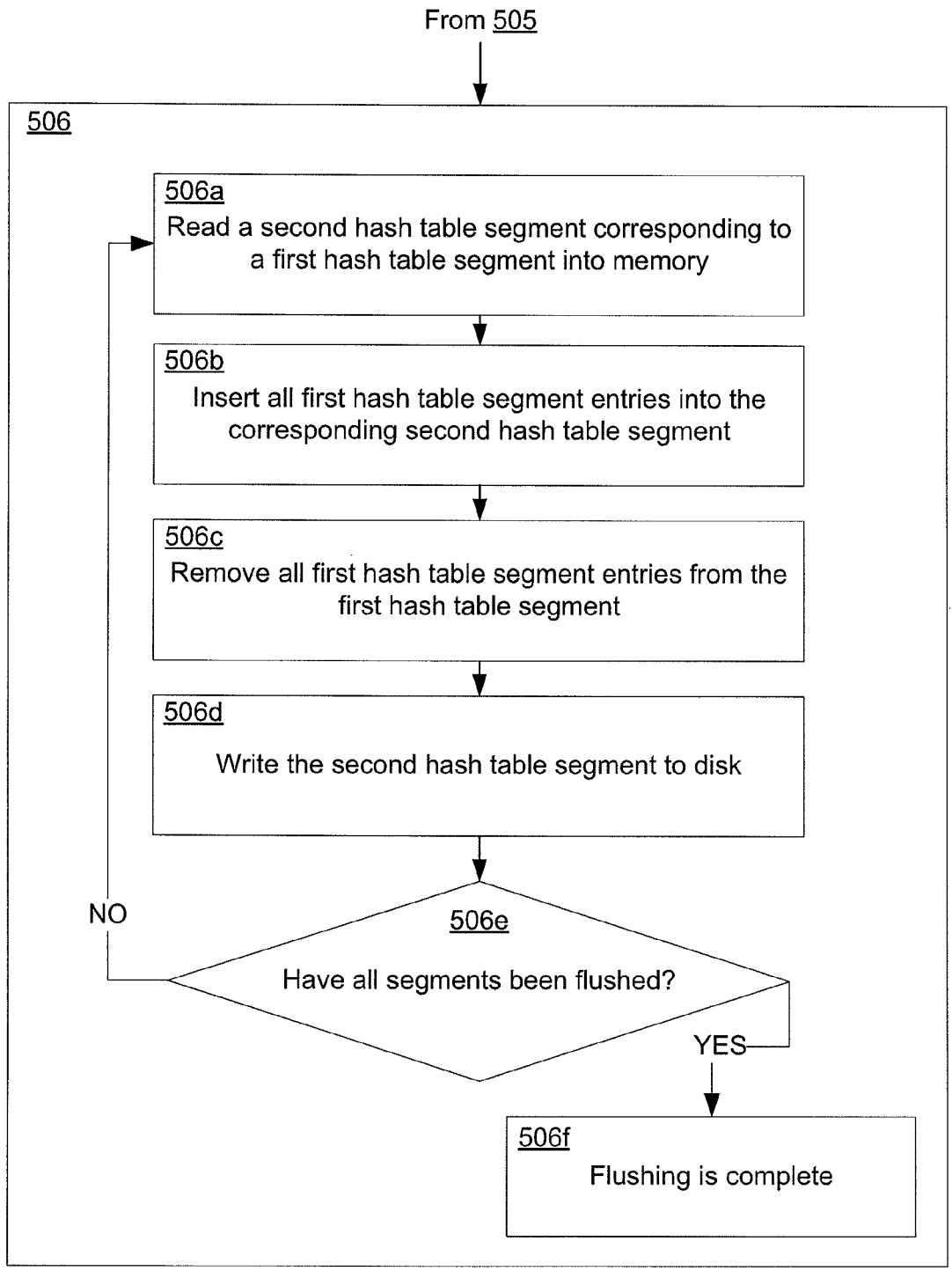
FIG. 5b illustrates an exemplary method for flushing entries from a first hash table into a second hash table system.

FIG. 5b illustrates an exemplary method that may be implemented at stage 506 in method 500 to flush entries from a first hash table into a second hash table. In this exemplary method, the first and second hash tables may be divided into hash table segments as shown in the exemplary hash table system 300 in FIG. 3. In stage 506a, a segment reading module reads a second hash table segment corresponding to a first hash table segment into memory. For example, on-disk hash table segment 31 corresponding to in-memory hash table segment 30 may be read into RAM 105. In stage 506b, a segment entry insertion module inserts all first hash table segment entries into the corresponding second hash table segment. For example, all entries in the in-memory hash table segment 30 are inserted into the on-disk hash table segment 31. In some embodiments, management modules 106 may apply a collision policy, such as linear probing during stage 506b such that if there is already an entry in an element in segment 31, the management modules 106 select another element in segment 31 for inserting the entry. In stage 506c, an entry removal module removes all first hash table segment entries from the first hash table segment. In this way, the first hash table elements are now cleared of entries so that new entries may be inserted. The management modules 106 may record an indicator that segments are being flushed and may implement locking mechanisms so that new entries are not allowed to be inserted into the segments that are participating in the flush operation in stage 506.

In stage 506d, a segment writing module writes the second hash table segment to disk. At this stage, the first hash table segment entries are now merged with the second hash table segment entries that were inserted before the method 500 begins. This new merged version would be read from RAM 105 into one of the disk drives 110, 120, . . . 130 where the on-disk hash table 302 is stored. If all first hash table segments have been flushed at stage 506e, then flushing is complete at stage 506f. If all first hash table segments have not yet been flushed at stage 506e, the entry flushing module then proceeds to flush another of the in-memory hash table segments. For example, after flushing entries from in-memory hash table segment 30 into on-disk hash table segment 31, the entry flushing module may sequentially flush entries from in-memory hash table segment 32 into on-disk hash table segment 33, from in-memory hash table segment 34 into on-disk hash table segment 35, and finally, from in-memory hash table segment 36 into on-disk hash table segment 37 by repeating stages 506a, 506b, 506c, and 506d for each of the in-memory hash table segment and on-disk hash table segment pairings. In alternative embodiments, the entire on-disk hash table 302 may be read into RAM 105 during the flushing process in stage 506a. In such embodiments, the in-memory hash table segments 30, 32, 34, 36 may still be sequentially flushed, as described above, or the flushing may be performed on the in-memory hash table 301 as a whole.

Flushing an In-Memory Hash Table into an On-Disk Hash Table

The following pseudo-code demonstrates an exemplary function for flushing an in-memory hash table, represented by the array memelements[index1], into an on-disk hash table, represented by the array diskelements[index2].

```
for each segment of the on-disk hash table {
    let segindex be the segment index (0, 1, 2, . . . )
    read the on-disk hash table segment into a buffer in main memory
    let the segelements array represent the entries
    set hotseg = the segment number
        for int index1 = segindex* mseg . . .
            segindex* mseg + meseg −1 {
            if memelements[index1] is empty, continue loop
            let h, v be the hash and value of the entry
                at memelements[index1]
            compute index2 = (h MOD sseg)
            while entries not exhausted {
                if segelements[index2] is empty {
                    insert entry containing h into
                        segelements[index2]
                    memelements[index1] = empty value
                    break from loop
                } else {
                    index2 = nextDiskProbe(index2)
                }
            }
        }
    write the content of segelements to the disk drive
    set hotseg = −1
}
``` where:

hotseg represents a variable used to record the segment of the on-disk hash table that is currently being updated during the flush function.

In the above pseudo code, the nextDiskProbe(index2) operation implements the selected collision policy. For example, for linear probing within a segment, as described above, nextDiskProbe(index2) could be implemented as follows:

```
int nextDiskProbe(index2)
    if index2 + 1 is at the end of the current segment {
        return index2 of beginning of segment
    } else {
        return index2 + 1
    }
```

Figure 6A:
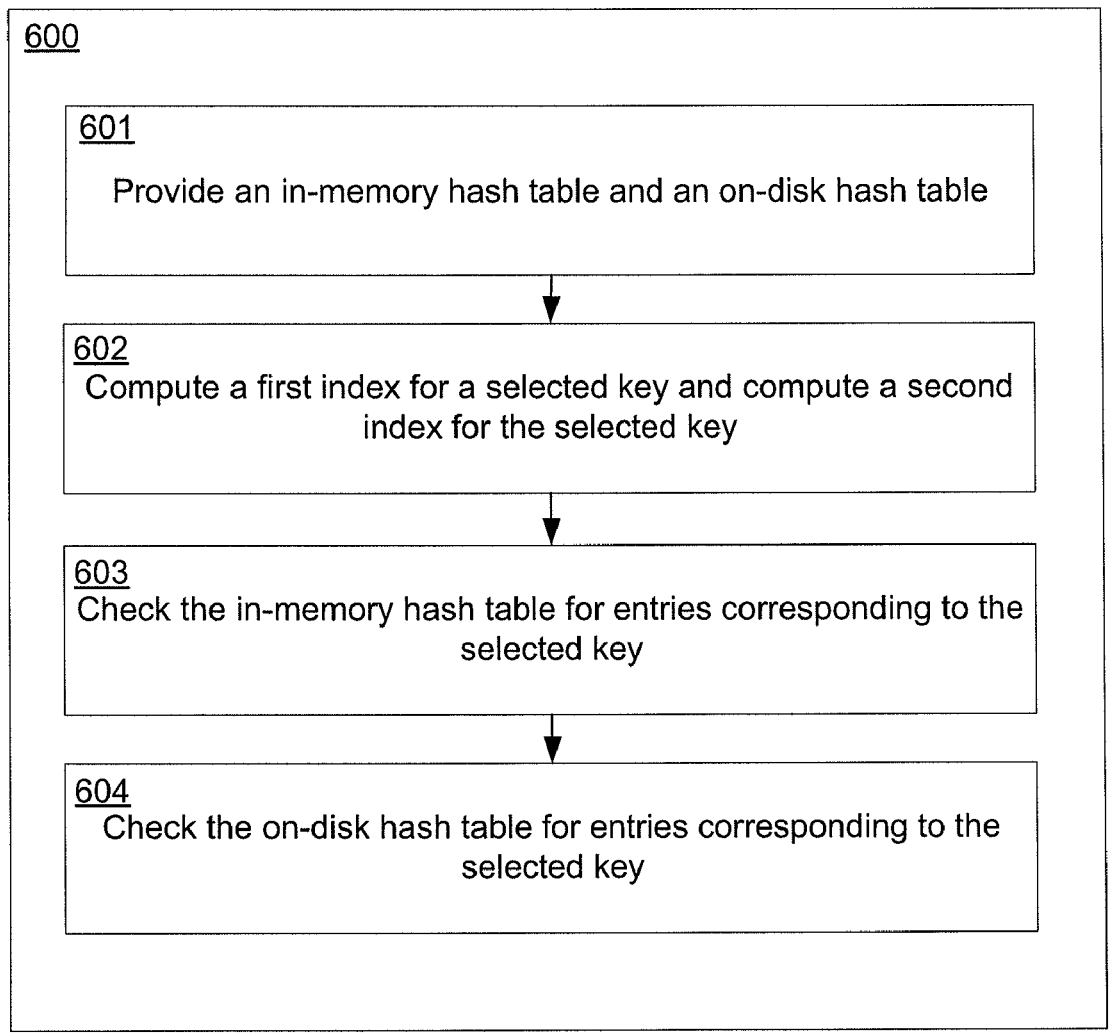
FIG. 6a illustrates an exemplary method for identifying a value associated with a selected key.

FIG. 6a illustrates an exemplary method 600 for identifying a value associated with a selected key, which may be implemented in a software module or modules, such as in one or more of the management modules 106 depicted in FIG. 1a. For example, exemplary method 600 may be performed by a identification module comprising one or more modules in management modules 106. The method may be performed using a hash table system, such as the hash table system 200 depicted in FIG. 2a.

In stage 601, management modules 106 provide an in-memory hash table and an on-disk hash table. In stage 602, an index computing module computes a first index for the selected key and computes a second index for the selected key. In stage 603, an in-memory checking module checks the in-memory hash table for entries corresponding to the selected key, and in stage 604, an on-disk checking module checks the on-disk hash table for entries corresponding to the selected key. In some embodiments both stages 603 and 604 are performed. In other embodiments, if the entry corresponding to the selected key is found in the in-memory hash table, then the on-disk hash table is not checked for entries corresponding to the selected key.

FIG. 6b illustrates an exemplary method that may be implemented at stage 603 in method 600 for checking an in-memory hash table for entries corresponding to a selected key. In stage 603a, a candidate element selection module selects first candidate elements from the in-memory hash table using the first index, the first candidate elements having associated first candidate keys. For each selected first candidate element from stage 603a, a candidate element examining module performs stage 603b to examine the first candidate keys. A candidate key module determines whether the first candidate key matches the selected key, and when the first candidate key matches the selected candidate key, a value identifying module identifies a value associated with the first candidate key as a member of the set of values associated with the selected key in stage 603c. If the first candidate key does not match the selected key, then a candidate element rejection module rejects the first candidate element associated with the first candidate key in state 603d. Method 600 may be similarly performed for checking an on-disk hash table for on-disk entries corresponding to a selected key.

Looking Up a Key

The following pseudo-code demonstrates an exemplary function for looking up a selected key (K) in a hash table system having an in-memory hash table, represented by the array memelements[index1], and an on-disk hash table, represented by the array diskelements[index2].

```
create an empty set S of candidate values
compute h = hashFunction (key)
compute index1 = (h MOD s) / r
// In the in-memory hash table:
while entries not exhausted AND memelements[index1] not empty {
    insert the value field at memelements[index1] into S
    index1 = nextMemProbe(index1)
}
// In the on-disk hash table:
compute index2 = (h MOD s)
read a block of element data from disk file
while entries not exhausted AND diskelements[index2] not empty{
    insert the value field at diskelements[index2] into S
    index2 = nextDiskProbe(index2)
}
for each value in S {
    retrieve the candidateKey associated with the value
    compare the candidateKey to K
```

-continued

```
        if the candidateKey does not match K then {
            remove value from S
        }
    }
    return S, the set of values matching K
``` where:
index1 = the index of the memelements hash table
index2 = the index of the diskelements hash table
s = on-disk hash table size;
c = in-memory hash table size; and
r = s / c (rounded to whole number).

In the embodiment described in the pseudo-code above, a candidate key matches the selected key (K) when the candidate key and the selected key may be identical.

Figure 7A:
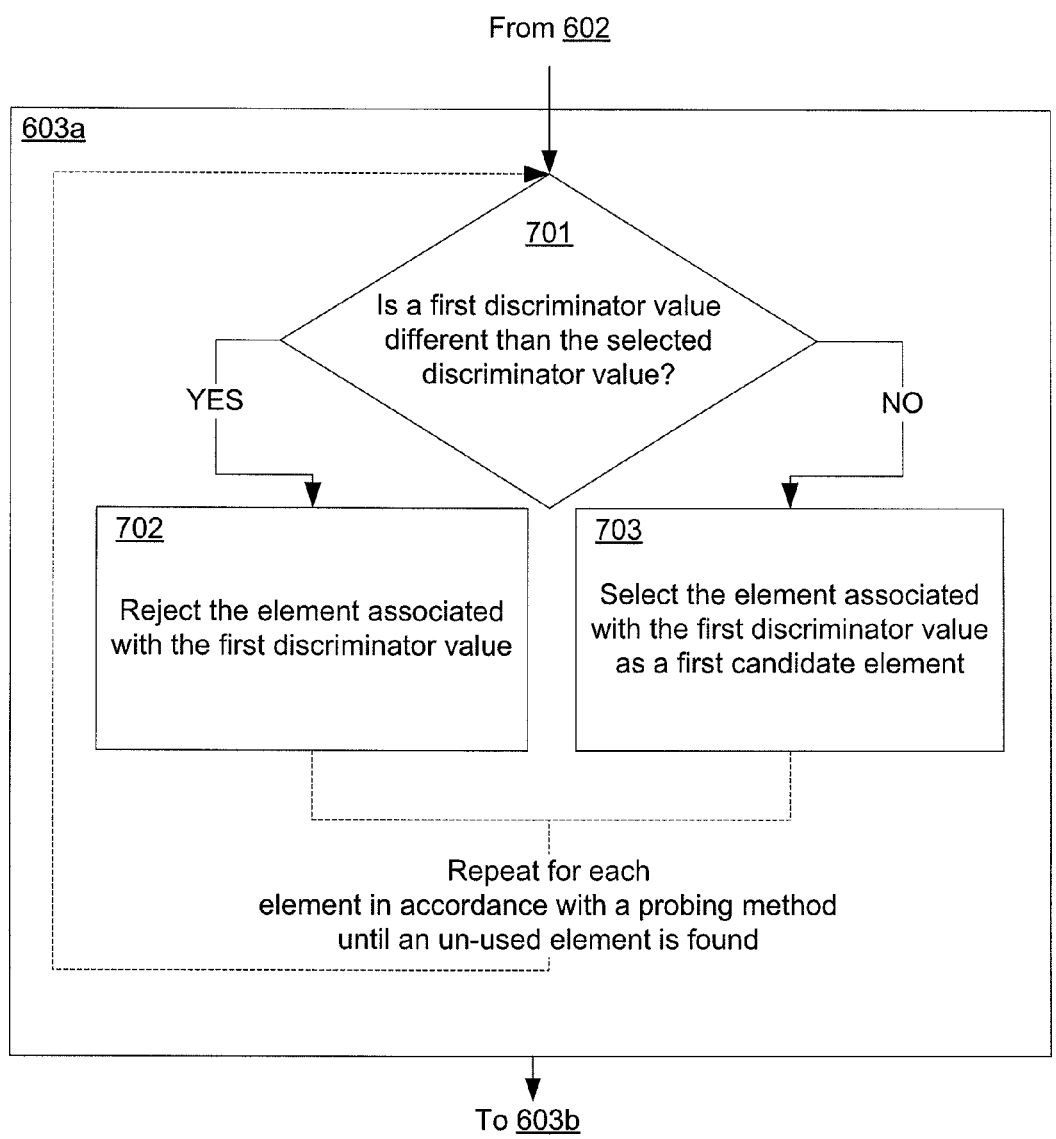
FIG. 7a illustrates an exemplary method for using a discriminator value to assist in checking an in-memory hash table for entries corresponding to a selected key.
Figure 7B:
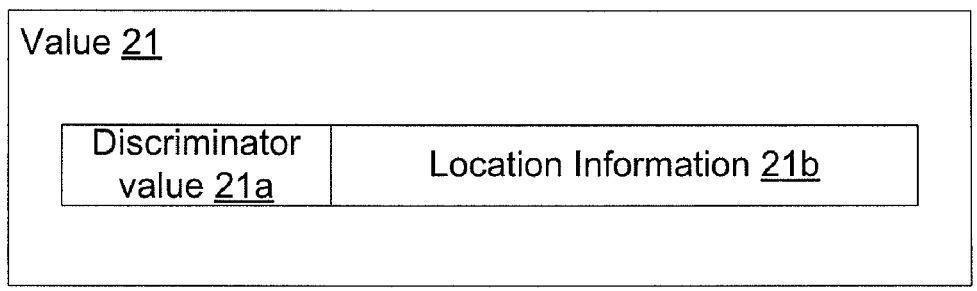
FIG. 7b illustrates an exemplary entry comprising a discriminator value and information relating to the location of an associated data object in a data storage system.

In another exemplary embodiment, illustrated in FIG. 7a, keys are associated with discriminator values, which may be used to reject false positive candidate elements in stage 603a. For example, as shown in the exemplary embodiment of FIG. 7b, entry 241 contains value 21, which comprises both discriminator value 21a and location information 21b. In stage 701, the management modules 106 check whether a first discriminator value corresponding to the first candidate element is different than the selected discriminator value corresponding to the selected key. If the values are different, a false positive candidate element rejection module rejects the element associated with the first discriminator value in stage 702. In this way, the key for the entry inserted into that element does not need to be compared with the selected key, which may result in system optimizations. If the discriminator values are not different, then the candidate element selection module described above selects the element associated with the first discriminator value as a first candidate element in stage 703.

The discriminator value may be particularly beneficial in an embodiment in which the second hash table 202 does not store the hash 20 with the value 21 (i.e. in the exemplary embodiment depicted in FIG. 2b), and in embodiments in which acquiring the candidate key is expensive (i.e. in embodiments in which acquiring the candidate key requires a disk read operation) because using the discriminator value can assist in rejecting many false-positive candidates before actually acquiring the candidate key from disk.

In one exemplary embodiment, discriminator value 21a may comprise a small integer field, and the size of that field depends on the structure of the hash table entries and the relative advantage of reducing the number of false positives versus the cost of increasing the number of bits stored with each entry in the hash table. In one illustrative embodiment, discriminator value 21a is computed from the hash value h by extracting information not used in computing the index of the element in the hash table. For example, if the size of the discriminator value 21a is 8-bits, then the following computation may be used to compute the discriminator value (dv):

$$dv = (h\backslash s) \mathrm{MOD}\ 256$$

where:
h is the hash value; and
s is the size of the on-disk hash table.

Looking Up a Key Using a Discriminator Value

The following pseudo-code demonstrates an exemplary function for using a discriminator value 21a when looking up a selected key (K) in a hash table system having an in-memory hash table, represented by the array memelements[index1], and an on-disk hash table, represented by the array diskelements[index2].

```
    create an empty set S of candidate values
    compute h = hashFunction (key)
    compute index1 = (h MOD s) / r
    // In the in-memory hash table:
    while entries not exhausted AND memelements[index1] not empty {
        insert the value field at memelements[index1] into S
        index1 = nextMemProbe(index1)
    }
    // In the on-disk hash table:
    compute index2 = (h MOD s)
    read a block of element data from disk file
    while entries not exhausted AND diskelements[index2] not empty {
        insert the value field at diskelements[index2] into S
        index2 = nextDiskProbe(index2)
    }
    compute selected_dv = (h / s) MOD (dvmax +1)
    for each value in S {
        retrieve the entry associated with the value
        compare the discriminator field value stored in the value to the selected_dv
        if the discriminator values do not match then {
            remove the value from S
        } else {
            retrieve the candidateKey associated with the value
            compare the candidateKey to K
            if the candidateKey does not match K then {
                remove value from S
            }
        }
    }
    return S, the set of values matching K
``` where:
index1 = the index of the memelements hash table
index2 = the index of the diskelements hash table
s = on-disk hash table size;
c = in-memory hash table size;
r = s / c (rounded to whole number); and
dvmax is the largest discriminator value 21a that can be encoded into value 21.

In the embodiment described in the pseudo-code above, if the space allocated for the discriminator field is one byte, for example, then dvmax may be 255. By using an 8-bit discriminator field, on average the number of key retrievals required to reject false positive candidate values may be reduced by a factor of 256.

The methods disclosed herein are especially useful in computer systems using an enterprise storage system, however, one of ordinary skill in the art will appreciate that the features and principles disclosed herein may be implemented in various computer systems. One of ordinary skill in the art will also appreciate that features and principles disclosed herein may be implemented in different components of a computer system with at least one associated data storage subsystem. Although the disclosed modules have been described above as being separate modules, one of ordinary skill in the art will recognize that functionalities provided by one or more modules may be combined. As one of ordinary skill in the art will appreciate, one or more modules may be optional and may be omitted from implementations in certain embodiments. Similarly, one of ordinary skill in the art will also appreciate that computer readable program code to implement a method consistent with features and principles disclosed herein may be stored on various media, including various persistent memory devices.

The embodiments and aspects of the features and principles set forth above are only exemplary and explanatory. They are not restrictive of the invention as claimed and do not limit the invention to the precise forms or embodiments disclosed. Other embodiments consistent with features and principles set forth above are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A computer-implemented method for inserting a new entry in a hash table system in a data storage system, the method comprising:
   providing the hash table system having a first hash table and a second hash table;
   computing a first index for the new entry, the first index corresponding to a first element in the first hash table;
   computing a second index for the new entry, the second index corresponding to a second element in the second hash table;
   inserting a first entry corresponding to the new entry into the first element in the first hash table; and
   when the first hash table reaches a threshold load factor, flushing the first entry from the first hash table,
      wherein flushing comprises inserting a value associated with the new entry into the second element in the second hash table, and removing the first entry from the first element in the first hash table.

2. The method of claim 1, wherein the first hash table is an in-memory hash table, and wherein the second hash table is an on-disk hash table.

3. The method of claim 1, wherein the first entry is the new entry.

4. The method of claim 1,
   wherein the first entry comprises the second index and the value associated with the new entry, and
   wherein inserting the value associated with the new entry into the second element comprises using the second index to locate the second element in the second hash table.

5. The method of claim 1,
   wherein the first entry comprises the value associated with the new entry, and
   wherein inserting the value associated with the new entry into the second element comprises
      using the value associated with the new entry to identify a key associated with the new entry,
      re-computing the second index for the new entry by performing a hash function on the key associated with the new entry, and
      using the re-computed second index to locate the second element in the second hash table.

6. The method of claim 1,
   wherein computing the second index comprises performing a hash function on a key associated with the new entry, and
   wherein computing the first index comprises dividing the second index by a ratio of a size of the second hash table to a size of the first hash table,
      wherein the ratio is rounded to an integer.

7. The method of claim 6,
   wherein computing the second index further comprises computing a first modulus of the hashed key and the size of the second hash table, and
   wherein computing the first index further comprises computing a second modulus of the divided second index and the size of the second hash table.

8. The method of claim 7, wherein the key associated with the new entry is a unique identifier of a data object stored in the data storage system.

9. The method of claim 6, wherein computing the second index further comprises computing a modulus of the hashed key and the size of the second hash table.

10. The method of claim 1,
    wherein inserting the first entry corresponding to the new entry into the first element in the first hash table further comprises
      checking whether the first element contains a previously inserted entry, and
      when the first element contains the previously inserted entry, executing a collision policy to find an unused element, and
      substituting the unused element for the first element.

11. The method of claim 10, wherein the collision policy is a linear probing method.

12. The method of claim 10,
    wherein the first hash table is divided into a plurality of first hash table segments, and
    wherein the collision policy is executed within a first hash table segment such that the unused element is found within the first hash table segment.

13. The method of claim 12,
    wherein the collision policy is a linear probing method, and
    wherein executing the collision policy within the first hash table segment comprises executing the linear probing method from a beginning of the first hash table segment.

14. The method of claim 1,
    wherein the second hash table is divided into a plurality of second hash table segments,
    wherein inserting the value entry associated with the new entry into the second element in the second hash table further comprises
      checking whether the second element contains a previously inserted entry, and
      when the second element contains the previously inserted entry, executing a collision policy to find an unused element, and
      substituting the unused element for the second element.

15. The method of claim 14,
    wherein the collision policy is a linear probing method and is executed within a second hash table segment such that the unused element is found within the second hash table segment, and
    wherein executing the collision policy within the second hash table segment comprises executing the linear probing method from a beginning of the second hash table segment.

16. The method of claim 1,
    wherein the first hash table is divided into a plurality of first hash table segments,
    wherein the second hash table is divided into a plurality of second hash table segments, each of the second hash table segments corresponding to one of the plurality of first hash table segments, and
    wherein flushing further comprises flushing all entries stored in one of the first hash table segments into its corresponding second hash table segment before flushing all entries stored in another of the first hash table segments into its corresponding second hash table segment.

17. A data storage system comprising:
    a hash table system comprising a first hash table and a second hash table;
    an insertion module for inserting a new entry in the hash table system, wherein inserting comprises
      computing a first index for the new entry, the first index corresponding to a first element in the first hash table;
      computing a second index for the new entry, the second index corresponding to a second element in the second hash table;

inserting a first entry corresponding to the new entry into the first element in the first hash table; and an entry flushing module for flushing the first entry from the first hash table when the first hash table reaches a threshold load factor, wherein flushing comprises inserting a value associated with the new entry into the second element in the second hash table, and removing the first entry from the first element in the first hash table.

18. The data storage system of claim 17, wherein the first hash table is an in-memory hash table, and wherein the second hash table is an on-disk hash table.

19. The data storage system of claim 17,
wherein the first entry comprises the second index and the value associated with the new entry, and
wherein inserting the value associated with the new entry into the second element comprises using the second index to locate the second element in the second hash table.

20. The data storage system of claim 17,
wherein the first hash table is divided into a plurality of first hash table segments, and
wherein inserting the first entry corresponding to the new entry into the first element in the first hash table further comprises
checking whether the first element contains a previously inserted entry,
when the first element contains the previously inserted entry, executing a collision policy within a first hash table segment such that an unused element is found within the first hash table segment, and
substituting the unused element for the first element.

21. The data storage system of claim 17,
wherein the second hash table is divided into a plurality of second hash table segments,
wherein inserting the value entry associated with the new entry into the second element in the second hash table further comprises
checking whether the second element contains a previously inserted entry, and
when the second element contains the previously inserted entry, executing a collision policy within a second hash table segment such that an unused element is found within the second hash table segment, and
substituting the unused element for the second element.

22. The data storage system of claim 17,
wherein the first hash table is divided into a plurality of first hash table segments,
wherein the second hash table is divided into a plurality of second hash table segments, each of the second hash table segments corresponding to one of the plurality of first hash table segments, and
wherein flushing further comprises flushing all entries stored in one of the first hash table segments into its corresponding second hash table segment before flushing all entries stored in another of the first hash table segments into its corresponding second hash table segment.

23. A computer program product comprising a non-transitory computer usable medium having computer-executable instructions that control a computer to perform a method for inserting a new entry in a hash table system, the method comprising the computer-implemented steps of:
providing the hash table system comprising a first hash table and a second hash table;
computing a first index for the new entry, the first index corresponding to a first element in the first hash table;
computing a second index for the new entry, the second index corresponding to a second element in the second hash table;
inserting a first entry corresponding to the new entry into the first element in the first hash table; and
when the first hash table reaches a threshold load factor, flushing the first entry from the first hash table,
wherein flushing comprises inserting a value associated with the new entry into the second element in the second hash table, and removing the first entry from the first element in the first hash table.

24. The computer program product of claim 23, wherein the first hash table is an in-memory hash table, and wherein the second hash table is an on-disk hash table.

25. The computer program product of claim 23,
wherein the first entry comprises the second index and the value associated with the new entry, and
wherein inserting the value associated with the new entry into the second element comprises using the second index to locate the second element in the second hash table.

26. The computer program product of claim 23,
wherein the first hash table is divided into a plurality of first hash table segments, and
wherein inserting the first entry corresponding to the new entry into the first element in the first hash table further comprises
checking whether the first element contains a previously inserted entry,
when the first element contains the previously inserted entry, executing a collision policy within a first hash table segment such that an unused element is found within the first hash table segment, and
substituting the unused element for the first element.

27. The computer program product of claim 23,
wherein the second hash table is divided into a plurality of second hash table segments,
wherein inserting the value entry associated with the new entry into the second element in the second hash table further comprises
checking whether the second element contains a previously inserted entry, and
when the second element contains the previously inserted entry, executing a collision policy within a second hash table segment such that an unused element is found within the second hash table segment, and
substituting the unused element for the second element.

28. The computer program product of claim 23,
wherein the first hash table is divided into a plurality of first hash table segments,
wherein the second hash table is divided into a plurality of second hash table segments, each of the second hash table segments corresponding to one of the plurality of first hash table segments, and
wherein flushing further comprises
flushing all entries stored in one of the first hash table segments into its corresponding second hash table segment before flushing all entries stored in another of the first hash table segments into its corresponding second hash table segment.

* * * * *